United States Patent [19]

Löhmer et al.

[11] 4,132,533

[45] Jan. 2, 1979

[54] PROCESS FOR THE PRODUCTION OF SPHERICAL BONDED ABRASIVE FROM ABRASIVE GRAIN

[75] Inventors: Wilfried Löhmer, Solingen; Josef Schotten, Dusseldorf-Benrath, both of Germany

[73] Assignee: The Carborundum Company, Niagara Falls, N.Y.

[21] Appl. No.: 852,651

[22] Filed: Nov. 18, 1977

Related U.S. Application Data

[63] Continuation of Ser. No. 673,835, Apr. 5, 1976, abandoned.

[30] Foreign Application Priority Data

Apr. 12, 1975 [DE] Fed. Rep. of Germany ....... 2516008

[51] Int. Cl.[2] ............................................ B24D 3/32

[52] U.S. Cl. ..................................... 51/295; 51/296; 51/298 R

[58] Field of Search ................ 51/298, 295, 296, 293, 51/673, 835

[56] References Cited

U.S. PATENT DOCUMENTS

| | | | |
|---|---|---|---|
| 2,947,124 | 8/1960 | Madigan et al. | 51/298 |
| 2,986,455 | 5/1961 | Sandmeyer | 51/296 |
| 3,684,466 | 8/1972 | Petrone | 5/298 |
| 3,925,034 | 12/1975 | Anna | 51/296 |
| 3,928,949 | 12/1975 | Wagner | 51/296 |

*Primary Examiner*—Donald J. Arnold
*Attorney, Agent, or Firm*—David E. Dougherty; Raymond W. Green

[57] ABSTRACT

Spherical bonded abrasives, having a hollow core and comprising abrasive grain fused on the periphery of a thermoplastic carrier, are made by (1) heating thermoplastic support media, enveloped by abrasive grain, within the thermoplastic range for sufficient time to fuse the abrasive grain onto the surface and (2) cooling. Such spheres are useful in coated abrasive products, providing greater useful life for coated abrasive belts so made.

2 Claims, 2 Drawing Figures

PROCESS FOR THE PRODUCTION OF SPHERICAL BONDED ABRASIVE FROM ABRASIVE GRAIN

This is a continuation, of copending application Ser. No. 673,835, filed Apr. 5, 1976 now abandoned.

BACKGROUND OF THE INVENTION

This invention relates to a spherical bonded abrasive and a process for its production. More particularly, it relates to hollow spherical bonded abrasives comprising a thermoplastic support onto the periphery of which is bonded abrasive granules.

Many abrasive operations with coated abrasives attain an incomplete utilization of the abrasive grain, due to the grain configuration. The typical abrasive grain fragmentation with edge renewal occurs in mechanically stable bonds customarily down to the height of the base adhesive coat. Due to the strong encasement of the remaining grain a renewal of the edge is no more possible. Weaker embedding of grains usually leads to complete grain break out at higher working pressure. Moreover, the high scratch depth attained during initial grinding decreases relatively quickly and in addition the efficiency of the grinding belt diminishes.

According to the present state of the art there existed already assessments to arrive at a better solution during surface machining through a different abrasive grain arrangement. Thus for example it was proposed to deposit and to bond abrasive grain on a carrier material loaded beforehand with cork chips. A coated abrasive, produced in such a manner, has the advantage of a larger abrasive grain potential per unit of area, whereas of course it had to put up with a smaller scratch depth due to a relatively soft cork backing.

A process for the production of bonded abrasive with porous grain is described in German Pat. No. 939,377. This process is characterized by wetting high melting oxides, in particular aluminum oxide, by transforming them through gas evolution with the help of hydrogen peroxide, and subsequent burning into porous single grains.

German patent application (Offenlegungsschrift) No. 2,425,887 describes the production and utilization of spherically encapsulated abrasive grains whereby the utilization is limited to polishing and lapping due to the special bond of the encapsulated abrasive grain. The abrasive grain is loosely embedded in the auxiliary grinding material (e.g., carnauba wax) and by encasing it for example in ureaformaldehyde it is transformed into spherical or ellipsoidal shape.

To improve the grinding process it was likewise proposed to use hollow spheroidal bonded abrasives together with conventional abrasive grain. Through the hollow spheroidal abrasive grain the porosity ought to be increased in order to make cooler grinding possible. For steel grinding the total fraction of hollow spheroidal abrasive shall not amont to more than 10% by weight in relation to the conventional abrasive grain. To increase the proportion in hollow spheroidal abrasive grain it was proposed in German patent application (Offenlegungsschrift) No. 2,349,326 to mix hollow unbroken bonded abrasives with splintery broken, cuplike bonded abrasives.

SUMMARY OF THE INVENTION

The essential scope of the invention on hand is to develop a spheroidal and in preference a hollow spherical bonded abrasive, which holds or firmly secures the individual abrasive grains on its periphery, so that there is not only an increased abrasive grain availability per unit area, but also that this availability is maintained during grinding over a longer period of time, and consequently a more uniformly high abrasion is attained during this time. The abrasive grains have to have a very good bonding within the bonded abrasive in order that during later utilization there arises no difficulty on the abrasive belt through dragging out of larger quantities of abrasive grains.

According to the invention this task is solved by a spherical bonded abrasive having a hollow core and consisting of abrasive grain fused on the periphery of a thermoplastic carrier.

DETAILED DESCRIPTION

Figure 1:
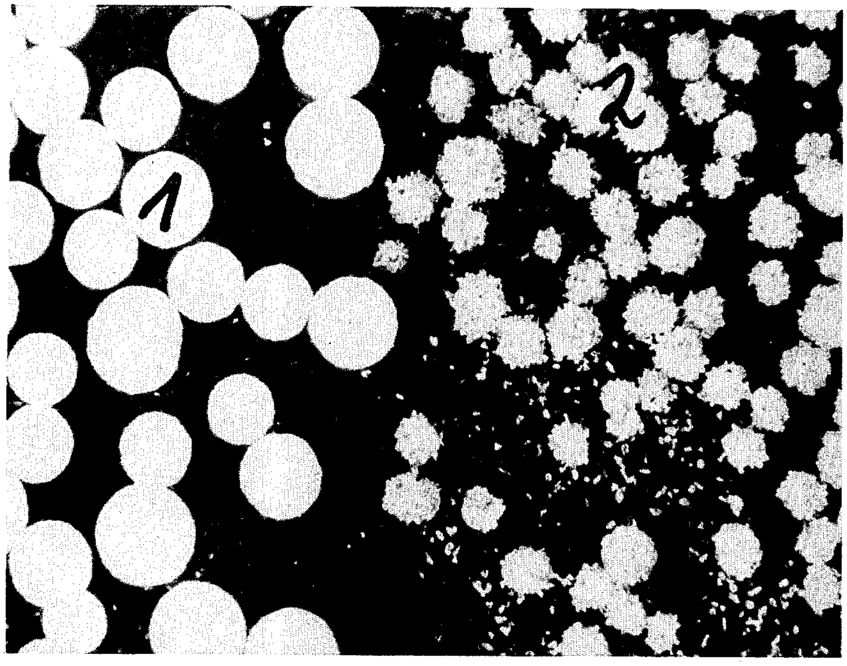
FIG. 1 is a photograph showing the spherical carrier used in the present invention, in its initial state, on the left; and the product of the invention, i.e., the spherical bonded abrasive after fusing in abrasive grain, on the right.

The abrasive grains are preferably in size between 600 and 3 microns, especially the grain size from 300 to 3 microns being the preferred one. The abrasives recommended are known materials as silicon carbide, beryllium oxide, boron carbide, and in particular aluminum oxide (corundum).

The individual abrasive grains are by preference fused into the carrier-material to an extent of from 1/5 to $\frac{1}{2}$ of the volume of the individual grains, in particular from $\frac{1}{4}$ to $\frac{1}{3}$. This leaves $\frac{1}{2}$ to 4/5 of the volume, preferably $\frac{2}{3}$ to $\frac{3}{4}$, exposed outside the carrier. The bonded abrasive consists of an internal thermoplastic encasement, which has on its outer surface a layer of abrasive grain, the volume of the abrasive grains being partly embedded in the thermoplastic. Such bonded abrasives are particularly suited for coated abrasives, wherein preeminently no conventional abrasive grain is present. It was shown, that these abrasive grains offer a large supply of freely protruding abrasive grain per unit of area, while on the other hand a premature break-loose of a whole grain is prevented. If after some grinding time an individual abrasive grain detaches itself from the sphere, there is immediately a new whole individual abrasive grain available. During practical application it is shown that the individual bonded abrasives open themselves (or are broken open) uniformly during grinding. The hollow spheres, being affixed firmly to the grinding belt overwhelmingly by the second "size" coat adhesive bonding, are uniformly abraded down to the height of the base adhesive coat. The special manner of abrasive grain embedding is extensively utilized, and the grain after being worn out is replaced by the next in line.

Attention is directed to the fact that grinding performance decreases with the increasing proportion of carrier-material, i.e., the thermoplastic within the hollow sphere (degree of sphere filling). For larger amounts of thermoplastic being present within the sphere a smaller amount of stock removal is achieved. For this reason it is recommendable that the void volume occupied by the individual, ready made spherical bonded abrasive amounts at least to 50%, preferably to 60%, and in particular to above 75% by volume.

As a carrier material a thermoplastic is therefore preferred, which after incipient melting is present as a hollow body and has, prior to fusion, an internal diameter from 0.1 to 3.0 millimeters. In particular, the inner diameter ought to be from 0.3 to 1.5 millimeters. Very good results are achieved if the carrier-material consists of polystyrene (especially of the trademarks STYROPOR or VESTIPOR).

It has to be taken into consideration that the size of the abrasive grain has to be purposely adapted to the thickness of the carrier-material. Hence, if for example, the inner diameter of the thermoplastic sphere is 0.3 to 0.5 millimeters, abrasive grains from 63 to 150 microns in size are advantageously used.

A preferred process for the manufacture of the claimed bonded abrasive is as follows. The thermoplastic carrier, especially foamed plastic carrier with cellular structure, is surrounded by abrasive grain and heated within the thermoplastic range of the plastic and held at that temperature until part of the abrasive grain volume, at the most one half and preferably only up to one third, is fused into the carrier, whereupon it is cooled. As thermoplastic carriers foamed spheres with outer diameters (prior to fusion) of from 0.5 to 6 millimeters, particularly from 1 to 3 millimeters, are especially used. Such spheres are heated within an excess of abrasive grain and after fusing and cooling, the excess in grain is separated. According to an especially preferred process, spheres of polystyrene foam are embedded or agitated tumbled or likewise in abrasive grain at a temperature within the thermoplastic range, preferably from 150 to 200° C. until the desired anchoring of the abrasive grain layer in the carrier-material is achieved. During the adjustment of temperature and time, it has to be taken care, that the fusion process proceeds more quickly, the higher the foamy sphere is heated within the thermoplastic range. During this heating a distinct decrease in sphere volume occurs. During the manufacturing process a layer of abrasive grain clings or adheres first onto the foamy sphere being heated. On further temperature increase the marked volume reduction of the foamy spheres occurs, whereby their diameter drops below a half of their original diameter and simultaneously, the microcells present within the foamy spheres are contracted into a hollow spherical shell. During such a fusion of the foamy plastic a part of the volume of the adhering grains become anchored and firmly bonded.

The manufacture can be carried out especially simply, continuously, in a rotary kiln whereinto thermoplastic spheres and abrasive grains are continuously fed and rolled. For moving spheres of polystyrene foam and a melting zone temperature from 160 to 170° C., a melting zone residence time of at least 30 seconds up to a maximum of 3 minutes, preferably from 1 to 2 minutes, is recommended.

Naturally the polysytrene softening point depends from its nature, as polymerization grade and additions. Therefore the melting temperature has to be adapted accordingly.

Subsequently the subject of invention is explained on the basis of FIGS. 1 and 2, which are photographs, and the Table, which shows stock removal behavior as a function of time.

FIG. 1 shows on the left half the carrier-material (polystyrene foamy plastic spheres) in the initial state and on the right half side the spheroidal bonded abrasive in the final state, i.e., after fusing in the abrasive grain, on the same scale as shown in for the initial state. The polystyrene plastic foamy spheres have in the initial state an average diameter of 1.5 millimeters, whereas the finished bonded abrasive has an outer diameter of less than 1 millimeter on the average.

Figure 2:
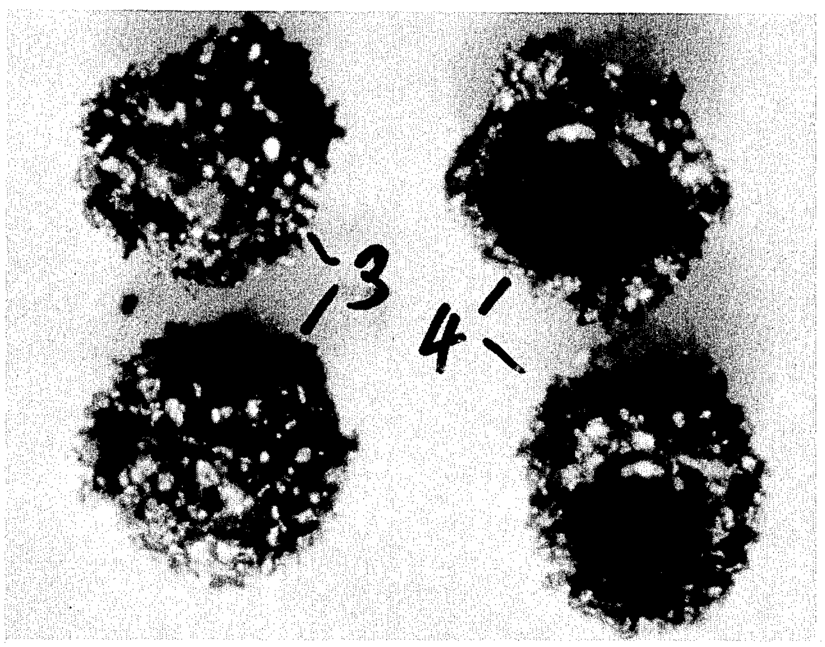
FIG. 2 is a photograph of 2.5 time greater enlargement of the product of the invention, both as made (left) and broken open to show internal structure (right).

As shown in the right half side of FIG. 2 by the magnification (2.5 times FIG. 1) of the broken open, bonded abrasive, the cellular structure of the foamy plastic sphere is after melting practically absent, i.e., the foamy plastic sphere is fused down to a hollow spherical shell. Into this hollow plastic shell are fused in the individual abrasive grains to about ⅓ of their volume.

The bonded abrasives shown in FIGS. 1 and 2 were produced as follows:

EXAMPLE 1

In a mixer foamy polystyrene plastic spheres preferably of low bulk density and of an average diameter of 1.5 millimeters are brought together with fused alumina or silicon carbide of the size P 180 (from 63 to 150 microns). While mixing the temperature is elevated to 160 or 170° C. During heating the foamy plastic spheres are jacketed uniformly by the abrasive grain above 110° C. The melting process commences at the temperatures in excess of 130° C. Over a time interval of 10 minutes the temperature increases to a maximum of 160° to 170° C. With increasing temperature and duration a volume decrease of the foamy plastic spheres sets in. After the total time of 30 minutes cooling starts and the surplus grain is separated from the hollow spheres.

EXAMPLE 2

Into a rotary kiln are fed polystyrene plastic spheres and abrasive grain of the same size as mentioned under Example 1. The rotary kiln has a preheating zone up to a maximum of 120° C. and a fusion zone up to a maximum of 180° C. The slope of the rotary kiln was chosen in order to have a feed residence time in every zone from about 1 to 2 minutes. After cooling at the rotary kiln outlet the surplus abrasive grain was screened from the bonded abrasive pieces.

The finished bonded abrasive had an outer diameter of about 0.5 to about 0.8 millimeters. In order to make a judgment about handling of bonded abrasives (adherence of the abrasive grains during further processing and transportation) the sizing method recommended by Federations Europeenne de Fabricants de Produits Abrasifs (FEPA) for the classification of abrasive grain was modified by sizing 30 grams of the hollow spheres in a commercially used sieving machine for 5 minutes. In spite of the high load the weight fraction of the rejected abrasive grain was less than 5% of the total. The weight fraction of the synthetic resin material is negligibly small.

The thus produced bonded abrasive was coated onto a conventional coated abrasive backing. As backing a phenolaldehyde (resole) coated cotton twill weave fabric was used. Onto this backing the bonded abrasive of this invention was applied in a single cross coat layer. Subsequently it was dried and a further layer of bond material was applied consisting of phenol-aldehyde (resole) and $CaCO_3$ as filler. Thereafter it was repeatedly dried and cured. This material was made up into a 50 × 2134 millimeter abrasive belt.

20 × 3 millimeter angle irons were ground on a backstand belt grinder at a band velocity of 28 meters/- second. The load (pressure) was held constant (and amounted to 1.5 kilograms). The irons were ground 15 times for 10 seconds per grinding period, with a 10-second interval between individual contacts. The results are set forth in the following Table:

TABLE

| TOTAL ELAPSED TIME (MINUTES) | STOCK REMOVAL GRAMS PER 2.5 MINUTES STANDARD | INVENTION |
|---|---|---|
| 2.5 | 26 | 22 |
| 5 | 17 | 20 |
| 7.5 | 14 | 21 |
| 10 | 12 | 20 |
| 12.5 | 9 | 18 |
| 15 | 5 | 19 |
| 17.5 | — | 19 |
| 20 | — | 18 |
| 22.5 | — | 19 |
| 25 | — | 18 |
| 27.5 | — | 13 |
| 30 | — | 12 |
| 32.5 | — | 10 |
| TOTAL | 83 | 229 |

The column marked "STANDARD" shows the stock removal during grinding with a conventional resin bonded fabric belt coated with corundum of size P 150. The TABLE shows that during the first 2.5 minutes grinding time a stock removal of 26 grams is achieved. This stock removal, however, diminishes very quickly in relation to the useful life, thus for example after 15 minutes of useful life (i.e., between 12.5 and 15 minutes) a stock removal of only 5 grams in a 2.5 minute period is attained. Compared to the above, the column marked "INVENTION" shows that the fiber belt coated with bonded abrasive of this invention identically constructed with regard to the abrasive grain, had a nearly uniform stock removal over a useful life of 25 minutes. Only after this time does the stock removal markedly diminish, this being concluded from the far advanced consumption of the bonded abrasive.

It is especially to be noted that for the conventional abrasive belt the total stock removal prior to belt consumption is only 83 grams whereas for the abrasive band according to the invention a stock removal of 229 grams was achieved.

The particular advantages of the subject of this invention consists in a high uniform stock removal attained over a long time period at a high load, thus the total abrasive material is utilized to its maximum. During the initial grinding phase the stock removal rate of an abrasive belt according to this invention is comparable with the same as for conventional electrostatically coated abrasive belts. The grinding performance per unit of time decreases, however, appreciably less than for conventional abrasive belts. Thereby a longer operational duration and an appreciably higher total stock removal from the abrasive belt of this invention results.

As already mentioned above it was found that the stock removal performance declines with the degree of filling the spheres. The filling degree of the sphere can first be varied by a corresponding processing manner during the prefoaming of the polystyrene, secondly by varying time and temperature during the melting process.

In addition it was found that after coating the bonded abrasive onto the abrasive belt the degree of filling of the bonded abrasive, might be decreased with suitable organic solvents (e.g., benzene).

Distinctive ways of production of the bonded abrasive as per this invention were presented. Production can be effected batchwise or continuously. Thus production in a fluidized bed is conceivable.

The bonded abrasive can be used by itself or in conventional processes for coated abrasives.

We claim:

1. A process for the production of abrasives in the form of hollow spheres, wherein abrasive grains are anchored on a thermoplastic spherical supporting surface by heating, wherein the improvement comprises (1) surrounding polystyrene foam carrier spheres having cellular structure and outer diameters prior to fusion of from 0.5 to 6 mm, with abrasive grains of from 63 to 150 microns in size; and (2) heating the polystyrene foam carrier within the temperature range of from about 150 to about 200° C. for a time sufficient for the spheres of polystyrene foam to experience a volume reduction of more than 50%.

2. A process according to claim 1, wherein the polystyrene foam carrier and abrasive grains are circulated in a rotary tubular furnace at a temperature of from 160° to 170° C. for one-half to three minutes.

* * * * *